No. 786,819. PATENTED APR. 11, 1905.
C. DE JONG.
PROCESS OF STERILIZING MILK OR OTHER FLUIDS.
APPLICATION FILED JAN. 3, 1903.
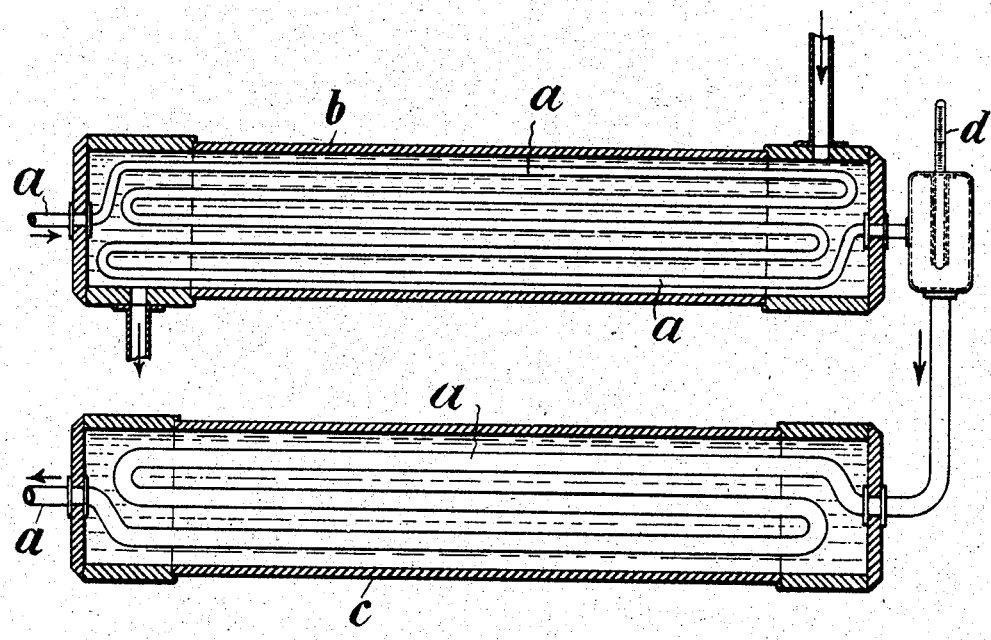
WITNESSES:
Fred White
Thomas F. Wallace
INVENTOR:
Corstiaan de Jong,
By his Attorneys:
Arthur E. Fraser & Co No. 786,819.  
Patented April 11, 1905.

UNITED STATES PATENT OFFICE.

CORSTIAAN DE JONG, OF HUIZE SNIPPESCHRIK AMSTELVEENSCHE WEG, NEAR AMSTERDAM, NETHERLANDS.

PROCESS OF STERILIZING MILK OR OTHER FLUIDS.

SPECIFICATION forming part of Letters Patent No. 786,819, dated April 11, 1905.

Application filed January 3, 1903. Serial No. 137,678.

*To all whom it may concern:*

Be it known that I, CORSTIAAN DE JONG, a subject of the Queen of the Netherlands, residing in Huize Snippeschrik Amstelveensche Weg, near Amsterdam, Netherlands, have invented certain new and useful Improvements in Processes of Sterilizing Milk or other Fluids, of which the following is a specification.

My invention aims to provide a new sterilizing process which is very effective and which is easily carried out and requires only the simplest apparatus, which is cheap in first cost and practically never requires repair.

The process employs heat and finds its most common application in the sterilizing of milk, but may be applied to other fluids.

Processes employing heat are already well known. Such known processes, however, are very detailed, especially in view of the apparatus employed in carrying them out, and possess other disadvantages and other inconveniences which are avoided by my improved process.

As is known, sterilization by means of a single heating depends only on the period of time during which the nitro-organisms are subjected to a determined temperature. The higher this temperature is carried the shorter can the period of time be. This circumstance is of especial weight where fluids are to be treated which readily undergo chemical changes during heating.

One of the known processes employed is the so-called "pasteurizing," which is characterized by a repeated warming to a temperature below 100° centigrade (70° to 90° centigrade) in order to permit in the intervals the development of the spores into bacteria in vegetable form, which then upon the successive warmings are gradually killed. In this process, therefore, the spores are not directly killed.

My improved process aims at a direct absolute sterilizing of the fluid, especially of milk, by means of the employment of a high temperature (that is to say, a temperature materially above 100° centigrade) during a very short time. My process aims not only at the killing of the bacteria themselves, but also simultaneously the killing of the spores.

In order to attain this end, I propose to heat the fluid to a temperature sufficiently high to completely sterilize it for such a short time as to avoid modifying its proper constitution. The process is preferably carried out in detail by passing the fluid at a high velocity through a tube, heating it above its boiling-point in the fore part of said tube—as, for example, by means of a steam-jacket surrounding the tube—and cooling it in the rear part of said tube—as, for example, by means of a water-jacket.

The accompanying drawing shows an apparatus suitable for the carrying out of the process. The apparatus shown consists, essentially, of a tubular coil $a$, the fore part of which is preferably of smaller diameter than the rear part and is surrounded by a chamber $b$ in order to heat the fluid passing through this part of the tube materially above its boiling-point and for a sufficient length of time by means of steam under very high pressure or by means of any other suitable heating medium at a high temperature. The rear part of the tube, which, preferably, as above explained, is of greater diameter than the fore part, is likewise provided with a chamber or jacket $c$ in order to quickly and immediately cool the hot fluid by means of water or some other cooling medium. Between the heating and cooling parts of the tube there is preferably arranged a thermometer $d$ in order to be able to observe the temperature. The length and diameter of the tube, as well as the temperature of the heating medium and the velocity of the fluid through the tube, are such and are so arranged relatively to each other that the length of time during which the fluid is subjected to the maximum temperature is, on the one hand, sufficient for complete sterilization, and, on the other hand, is too short for any change whatever in the proper constitution of the fluid. When these precautions are observed, milk, which is in the greatest degree sensitive to all kinds of influences, comes out of the apparatus not only perfectly and completely sterilized, but also unchanged in color, smell, and taste. The exact length of time the fluid is subjected to the heating action varies, of course, with different fluids and dimensions of the apparatus. In practicing my process—for example, in sterilizing milk—I have obtained good results when using a heating-tube of about twenty-seven meters in length and about eight millimeters in diameter and working at a temperature of from about 145° to 150° centigrade (293° to 302° Fahrenheit) by regulating the velocity of the fluid in such a manner that ten liters of sterile milk are produced in one minute, in which case the velocity of the fluid amounts to about three meters in one second. In thus practicing my process the fluid is rapidly heated throughout highly above its boiling-point for a short period, passing with great velocity through the long tube, which is preferably of the small diameter stated, whereby in a sure and perfect manner all parts of the fluid come in contact with the hot walls of the heating-pipe, and the bulk of the liquid possesses the highest temperature only for a very short time.

The simple apparatus which may be used for the carrying out of my process has the great advantage over other apparatus operating with high temperatures that it avoids the necessity for stirring mechanism to prevent burning of the fluid and that on account of its simplicity it can be very cheaply made and is substantially incapable of getting out of order.

Though I have described with great particularity of detail a process embodying my invention and an apparatus suitable for the carrying out of the process, yet it will be understood that the process described may be modified by those skilled in the art without departure from the invention and that a great variety of apparatus may be employed in the carrying out of the process.

The tube $a$ can of course be bent or wound in various ways and may be made of any desired material which may seem suitable.

I claim as my invention—

1. The process of sterilizing fluids which are very sensitive to heat, which consists in heating the fluid to a temperature sufficiently high to completely sterilize it, but for such a short time as to avoid modifying its original constitution and properties, substantially as and for the purpose set forth.

2. The process of sterilizing fluids which are very sensitive to heat, which consists in imparting to the fluid a very high velocity, heating it highly above its boiling-point, and immediately cooling it, substantially as and for the purpose set forth.

3. The process of sterilizing fluids which are sensitive to heat, which consists in passing the fluid in a comparatively small stream into contact with a highly-heated medium, and thereby heating it above its boiling-point so that its complete sterilization takes place, and then cooling it by bringing it into contact with a cooling medium before its original constitution and properties are changed.

4. The process of sterilizing fluids which are sensitive to heat, which consists in causing the fluid to pass at a high velocity along a conduit, and at one point in its passage subjecting it while in motion to the action of a high degree of heat, so that the fluid is raised well above its boiling-point, and then subjecting it to a cooling action before the action of the heat has been continued long enough to change the original properties of the fluid.

5. The process of sterilizing milk which consists in heating the same to a temperature above its boiling-point to completely sterilize it, and then cooling it before its proper constitution is modified.

6. The process of sterilizing milk which consists in heating the same to a temperature considerably above its boiling-point for a brief period, and then immediately cooling the same.

In witness whereof I have hereunto signed my name in the presence of two subscribing witnesses.

CORSTIAAN DE JONG.

Witnesses:
 W. F. TROOST,
 PAUL STAAL.